(12) United States Patent
Trowbridge et al.

(10) Patent No.: US 12,459,303 B2
(45) Date of Patent: Nov. 4, 2025

(54) TIRE SIPE DESIGN WITH VARIABLE TEARDROP SIZE HAVING LARGER LATERAL MIDPOINT

(71) Applicant: COMPAGNIE GENERALE DES ETABLISSEMENTS MICHELIN, Clermont-Ferrand (FR)

(72) Inventors: Jeremy David Trowbridge, Greenville, SC (US); Victor Abarotin, Greer, SC (US); Arthur Rade, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 18/558,022

(22) PCT Filed: Jun. 10, 2021

(86) PCT No.: PCT/US2021/036810
§ 371 (c)(1),
(2) Date: Oct. 30, 2023

(87) PCT Pub. No.: WO2022/260673
PCT Pub. Date: Dec. 15, 2022

(65) Prior Publication Data
US 2024/0217272 A1    Jul. 4, 2024

(51) Int. Cl.
*B60C 11/04*  (2006.01)
*B60C 11/12*  (2006.01)
*B60C 11/03*  (2006.01)

(52) U.S. Cl.
CPC ...... *B60C 11/1281* (2013.01); *B60C 11/1218* (2013.01); *B60C 2011/0348* (2013.01);
(Continued)

(58) Field of Classification Search
CPC ............ B60C 11/1281; B60C 11/1218; B60C 2011/1213; B60C 2011/0348; B60C 2011/0397
See application file for complete search history.

(56) References Cited

U.S. PATENT DOCUMENTS

2009/0159167 A1*  6/2009  Scheuren ............ B60C 11/1281
                                                         425/470
2012/0234443 A1    9/2012  Kurokawa et al.
(Continued)

FOREIGN PATENT DOCUMENTS

DE    102019211027 A1    1/2021
JP    01-101205 A    *    4/1989
(Continued)

OTHER PUBLICATIONS

Machine translation for Japan 2008-279865 (Year: 2024).*
(Continued)

*Primary Examiner* — Steven D Maki
(74) *Attorney, Agent, or Firm* — Neal P. Pierotti (57) ABSTRACT

A tread for a heavy truck tire that has a rib is provided. A sipe is located in the rib and extends from a first lateral surface to a second lateral surface. A first end of a teardrop of the sipe is located at the first lateral surface, and a second end is at the second lateral surface. A middle section is located between the first and second ends, and a lateral midpoint of the teardrop is located at the middle section. A cross-section of the middle section at the lateral midpoint is greater in size than a cross-section of the first end. The cross-section of the middle section at the lateral midpoint is greater in size than a cross-section of the second end.

9 Claims, 10 Drawing Sheets

(52) U.S. Cl.
CPC ............... *B60C 2011/0397* (2013.01); *B60C 2011/1213* (2013.01); *B60C 2200/06* (2013.01)

(56) References Cited

U.S. PATENT DOCUMENTS

| | | |
|---|---|---|
| 2014/0130950 A1 | 5/2014 | Guichon |
| 2016/0318347 A1 | 11/2016 | Bardin et al. |
| 2019/0329598 A1* | 10/2019 | Park ................... B60C 11/0323 |
| 2019/0381837 A1* | 12/2019 | Dixon .................... B60C 11/04 |

FOREIGN PATENT DOCUMENTS

| | | | |
|---|---|---|---|
| JP | 2008-279865 A | * | 11/2008 |
| JP | 2013133084 A | | 7/2013 |
| KR | 10-1037410 B1 | * | 5/2011 |
| WO | WO-2019/108173 A1 | * | 6/2019 |

OTHER PUBLICATIONS

Machine translation for Japan 01-101205 (Year: 2024).*
Partial machine translation for Japan 01-101205 (Year: 2024).*
Machine translation for Korea 10-1037410 (Year: 2024).*
European Patent Office, International Search Report and Written Opinion, dated Feb. 4, 2022, pp. 1-16 (included), European Patent Office, Rijswijk, The Netherlands.

* cited by examiner

TIRE SIPE DESIGN WITH VARIABLE TEARDROP SIZE HAVING LARGER LATERAL MIDPOINT

CROSS-REFERENCE TO RELATED APPLICATIONS

The present application is a 35 U.S.C. § 371 application of PCT/US2021/036810 filed on Jun. 10, 2021 and entitled "Tire Sipe Design with Variable Teardrop Size Having Larger Lateral Midpoint" and claims benefit thereto. The entire contents of PCT/US2021/036810 are incorporated by reference herein in their entirety for all purposes.

FIELD OF THE INVENTION

The subject matter of the present invention relates to sipes for tires that feature a teardrop that has a variable size to minimize or eliminate cracking in the teardrop. More particularly, the present application involves a sipe in a rib with a teardrop that has a larger size in its center than at its ends so that cracking is minimized or reduced while achieving a compromise with rolling resistance and end of service traction.

BACKGROUND OF THE INVENTION

Tires normally include tread that has a series of ribs that extend in a circumferential direction of the tire separated in the axial direction by grooves. The ribs can be provided with a series of sipes that function to improve traction in certain road conditions. The sipes are thin slits cut into the ribs and can be made in a variety of manners. For instance, the shape along the lengths of the sipes may be straight, zig-zag, undulating, or angled into the tire elements. The sipe depths may also vary or be consistent along their lengths, and may extend into the tread all the way to the end of life tread depth. The sipes may close within the tire "footprint" on the road, and can increase the flexibility of the tread block into which the sipes are located. The presence of sipes can improve stopping distance, breakaway traction, and rolling traction on glare ice. Additionally sipes have been found to improve traction for tires in snow, mud, and other types of ice.

It is known to provide sipes with a teardrop shape that tends to increase traction of the tire when the tire is near the end of its life. The teardrop feature in the sipe is an increase in the circumferential length of the sipe at an area of the sipe closer to the center of the tire in the radial direction. This increase in circumferential length causes the sipe to have a larger void radially closer to the tire center than portions of the sipe radially farther form the tire center. When the tire tread wears down, the larger void portion will open up and be exposed to the road surface and will improve traction and water removal when the tire is nearing the end of its life.

Although the inclusion of sipes helps improve tire performance in certain areas, the addition of these cut features into the ribs of the tire may also cause a risk of irregular wear on the ribs, increased rolling resistance, degradation in sculpture robustness, and a risk of increased chipping and chunking. Sipes that are present in shoulder ribs of heavy commercial truck tires may cause irregular wear and sipe aggression. Sipe aggression is the cracking or breaking of the shoulder rib due to a stress concentration caused by the sipe. When a drive tire experiences torque, cracking in the shoulder rib may occur at the bottom of the teardrop and subsequently extend away from this initiation site.

A known approach to prevent or minimize cracking at the bottom of the teardrop is to make the teardrop larger in size, which would generally mean an increase in the diameter of the teardrop causing it to be larger in the circumferential direction of the tread. Increasing the size of the teardrop radius increases end of service traction, but decreases rigidity in the tread block. This decrease in rigidity is because there is less material making up the tread block so that material between the teardrop and the upper surface is much less rigid. This has a negative impact in that wear performance is reduced, and rolling resistance performance is reduced. Another way of minimizing or eliminating cracking at the bottom of the teardrop is to move the teardrop up in the thickness direction so that it is closer to the upper surface of the tread, thus making the sipe not as deep overall as it otherwise would have been. However, moving the teardrop up closer to the upper surface of the tread decreases end of service traction associated with the sipe. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a sipe 22 design for a tread 12 of a heavy truck tire 10 that reduces or eliminates crack propagation while at the same time maintaining rigidity and end of life performance. The sipe 22 extends from a first lateral surface 18 to a second lateral surface 19 and has a teardrop 32 with a first end 34 at the first lateral surface 18 and a second end 36 at the second lateral surface 19. A lateral midpoint 40 of the teardrop 32 has a cross-section that is greater is size than the cross-section at the first end 34 or the second end 36. The larger size of the teardrop 32 at the lateral midpoint 40 reduces or eliminates crack initiation and propagation at this location which is the area of the teardrop 32 crack formation is most likely to occur. With this geometric relationship, the overall depth of the sipe 22 in the thickness direction 24 does not need to be moved up to the upper surface 16, and the cross-sectional size of the teardrop 32 along its entire length does not need to be increased.

Figure 1:
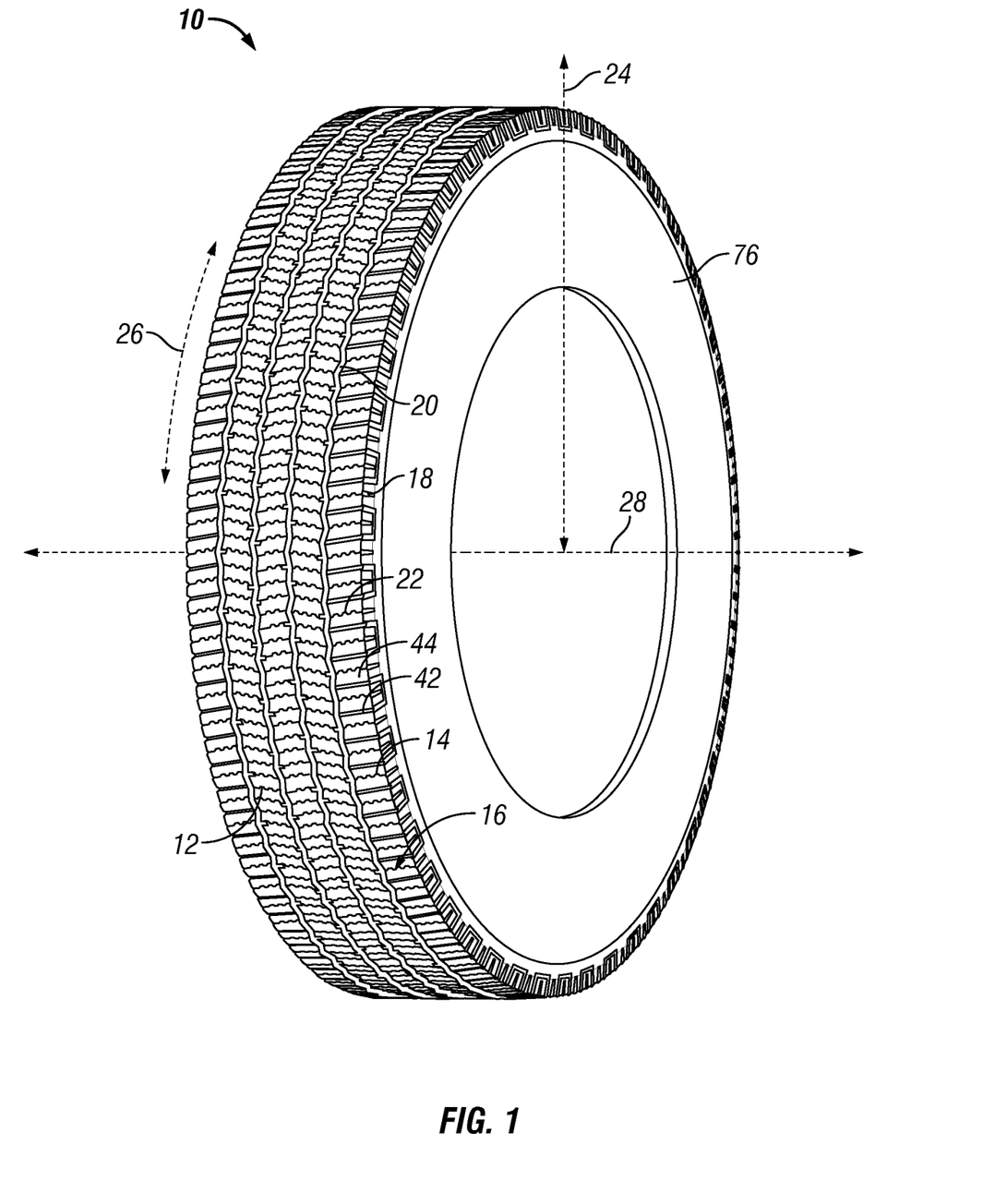
FIG. 1 is a perspective view of a tire that includes sipes in a rib.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. In a preferred embodiment, the tire 10 that includes the sipe 22 as used herein is a drive tire of a tractor of a tractor trailer. The tire 10 includes a casing/carcass 76 onto which a tread 12 is disposed thereon. The central axis of the tire 10 extends through the center of the carcass 76, and the lateral/axial direction 28 of the tire 10 is parallel to the central axis. The radial direction 24, which is also known as the thickness direction 24, of the tire 10 is perpendicular to the central axis, and the tread 12 is located farther from the central axis in the thickness direction 24 than the carcass 76. The tread 12 extends all the way around the carcass 76 in the circumferential direction 26 of the tire 10 and circles the central axis 360 degrees.

The tread 12 features five ribs that are separated by four longitudinal grooves that extend in the circumferential direction 26. The five ribs can be classified as a central rib, two intermediate ribs, and two shoulder ribs one of which is marked as shoulder rib 14. The shoulder rib 14 is located on one side of the tread 12 in the lateral direction 28, and the second shoulder rib is located on an opposite side of the tread 12 in the lateral direction 28. A first lateral surface 18 of the shoulder rib 14 is present at the first shoulder rib 14 and is the outer most surface of the tread 12 in the lateral direction 28. The ribs can each be made up of a number of tread blocks, the blocks in the shoulder rib 14 being identified as shoulder rib blocks 44, that can have various shapes, sizes, and structural features to cause the tread 12 to have different performance properties. Rib grooves 42 separate the shoulder rib blocks 44 along the length of the shoulder rib 14 in the circumferential direction 26. The rib grooves 42 may have a width that is greater than 2 millimeters. Although composed of a series of shoulder rib blocks 44, the shoulder rib 14 need not have any shoulder rib blocks 44 in other embodiments.

The tread 12 may include certain structural features that can reduce tearing or crack initiation and propagation. One such structural feature shown with reference to FIG. 2 may be sipes 22 that extend across the entire lateral width of the shoulder rib 14 in the lateral direction 28. The sipes 22 are thin grooves/cuts in the shoulder rib 14. The sipes 22 at the upper surface 16 of the shoulder rib 14 may have widths that are two millimeters or less. The sipe 22 has a body 30 that extends from the upper surface 16 down into the shoulder rib 14 in the thickness direction 24, and the body 30 has a width that is less than 2 millimeters. At the bottom of the body 30, a teardrop 32 is included in the sipe 22. The teardrop 32 may be less than two millimeters or may be greater than or equal to two millimeters in cross-sectional size or diameter.

The sipes 22 are shown and described as being within the shoulder rib 14, but this is but one embodiment as the sipes 22 as described herein could be in any one or more of the shoulder ribs, intermediate ribs, or center ribs, or any rib of the tread 12. The rib can thus be the shoulder rib 14, the intermediate rib, the center rib, or any rib of the tread 14. When the rib is the shoulder rib 14, the first lateral surface 18 is an outer lateral surface of the tread 14, and the second lateral surface 19 is a surface of the shoulder rib 14 that faces the shoulder groove 20 and could be said to define a portion of the shoulder groove 20.

Figure 2:
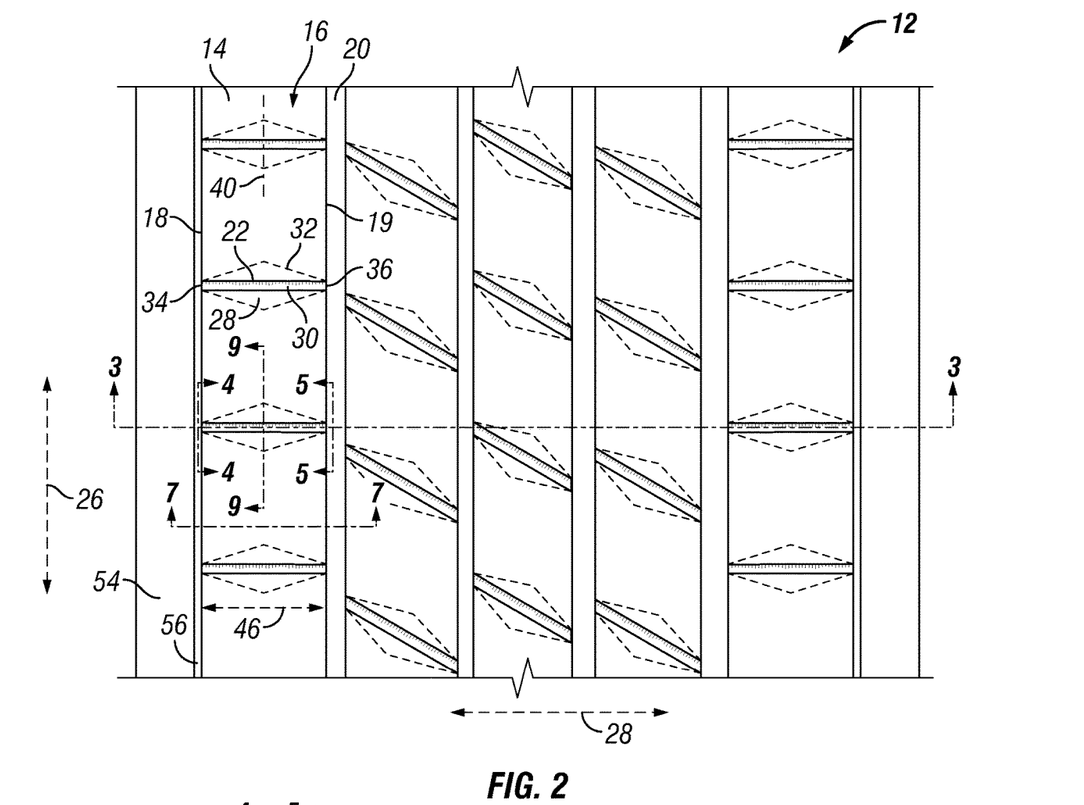
FIG. 2 is a top view of a tread having the sipes in accordance with one exemplary embodiment.
Figure 3:
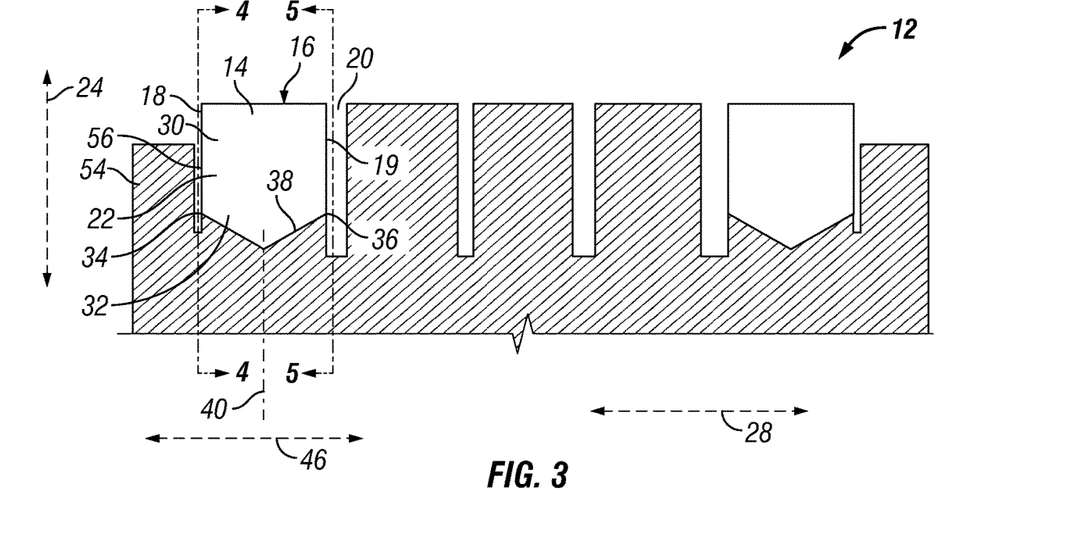
FIG. 3 is a cross-section view taken along line 3-3 of FIG. 2.

FIG. 2 shows four sipes 22 in the shoulder rib 14, and four sipes 22 in the oppositely disposed shoulder rib on the other side of the tread 12 in the lateral direction 28. The sipes 22 are also disposed within the intermediate ribs and center rib. The sipes 22 could all be configured as having the same size and geometry, or they may be of different sizes and/or geometries. In FIG. 2, all of the sipes 22 shown have the same geometric configuration. Any number of sipes 22 can be present in the tread 16 in accordance with various exemplary embodiments, and the left hand shoulder rib 14 may or may not have the same number of sipes 22 as the right hand shoulder rib. It should be noted that the shoulder rib 14 is not at the lateral outboard of the tread 12 in the lateral direction 28, but instead a sacrificial rib 54 is outboard of the shoulder rib 14 in the lateral direction 28. A sacrificial rib groove 56 separates the sacrificial rib 54 from the shoulder rib 14, and the sacrificial rib 54 is designed to protect the shoulder rib from abnormal wear during use of the tread 12. As shown in FIG. 3, the sacrificial rib 54 does not extend in the thickness direction 24 to the same location as the upper surface 16 in the thickness direction 24. The sipes 22 as described herein are not those that may or may not be in the sacrificial rib 54, but are those that are within the shoulder rib 14 that is distinguished from the sacrificial rib 54 and that is distinguished from center, intermediate, or other ribs of the tread 12. In some embodiments, the sacrificial rib 54 has a height that extends in the thickness direction 24 so that its upper surface is at the same height as the upper surface 16 in the thickness direction. It is to be understood that when used herein, the term rib does not include a sacrificial rib 54 of the tread 12 if such sacrificial rib 54 is in fact present in the tread 12. The rib into which the disclosed sipe 22 can be included is the shoulder rib 14, intermediate rib, center rib, or any other rib of the tread 12 with the exception of a sacrificial rib 54 if such sacrificial rib 54 is in fact present.

Figure 5:
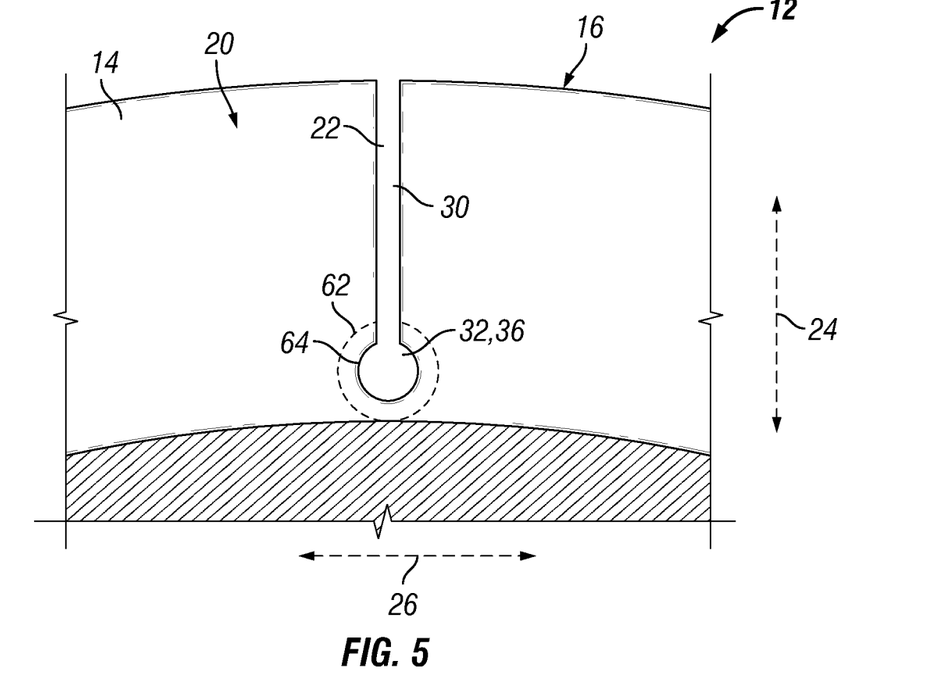
FIG. 5 is a cross-section view taken along line 5-5 of FIG. 2.
Figure 6:
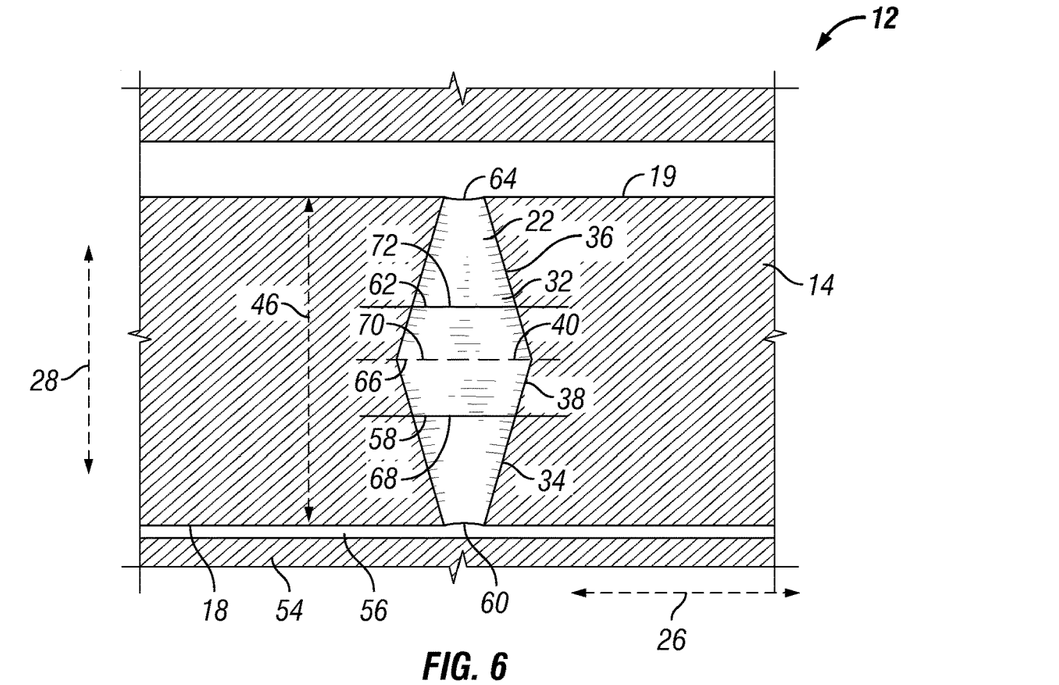
FIG. 6 is a cross-section view taken along line 6-6 of FIG. 4.
Figure 7:
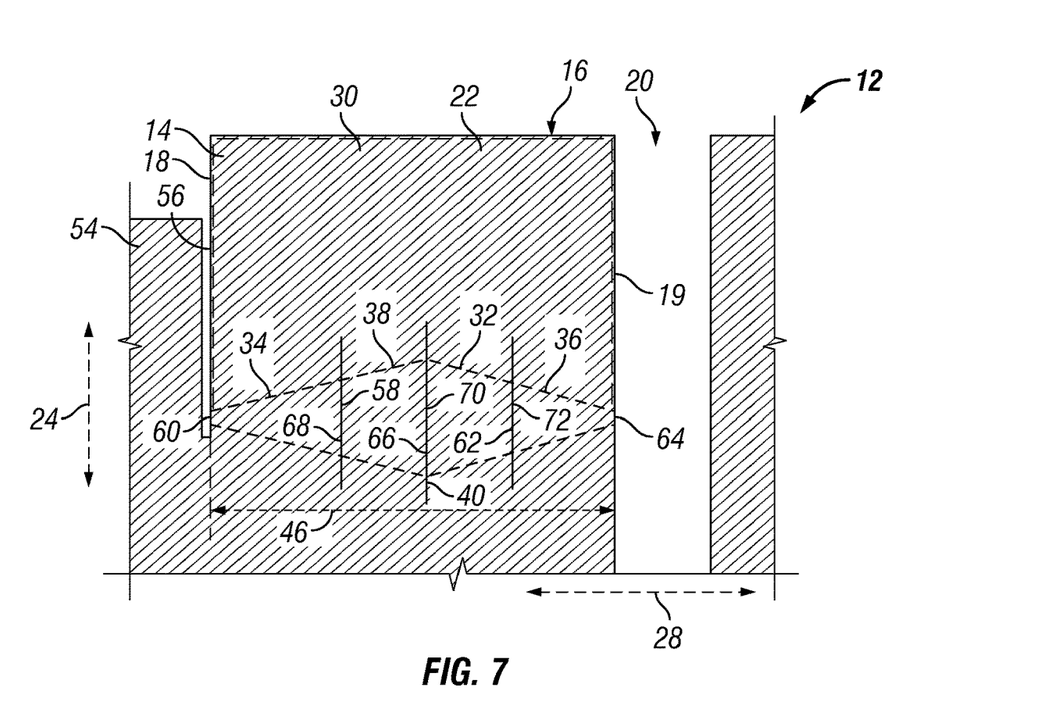
FIG. 7 is a cross-section view taken along line 7-7 of FIG. 2.
Figure 8:
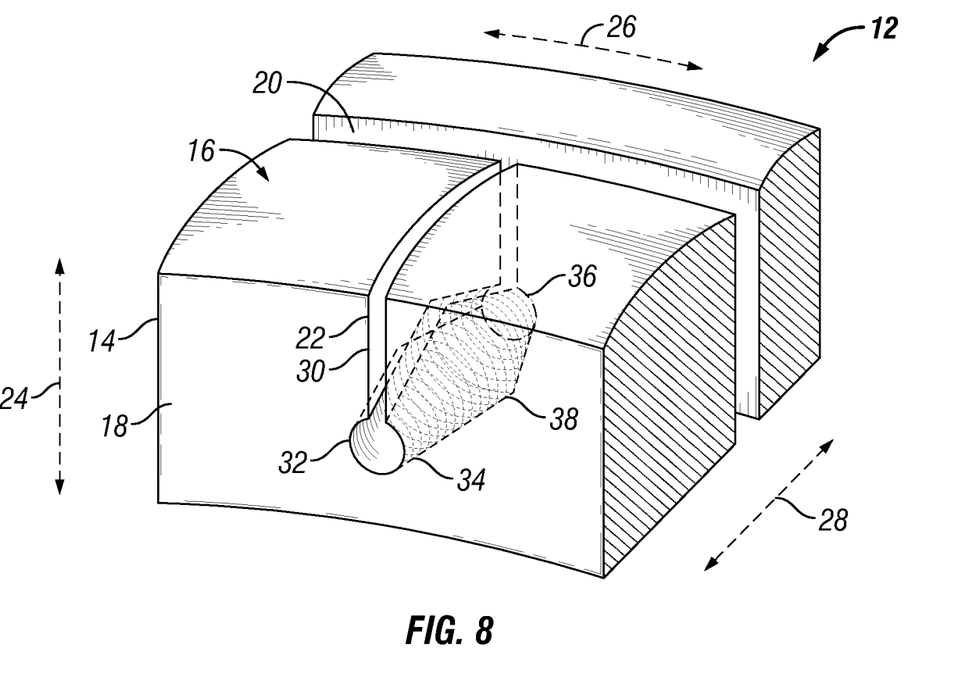
FIG. 8 is a perspective view of a section of the tread of FIG. 2 that includes a sipe in the rib.

One of the sipes 22 is shown in FIGS. 3-9. FIG. 8 shows a perspective view of the sipe 22 in which the body 30 is a linear cut having a consistent width that extends from the upper surface 16 down into the tread 12 in the thickness direction 24 and opens up into a teardrop 32 at the bottom of the sipe 22. The teardrop 32 may be referred to herein as having a "cigar" shape in that it is larger in its center and becomes smaller towards its ends. With reference in particular to FIG. 7, the shape of the teardrop 32 may be seen as being two cones that extend from a lateral midpoint 40 of the teardrop 32, one in the inboard direction and the other outboard in the lateral direction 28. The overall length of the teardrop 32 in the lateral direction 28 is illustrated in FIG. 7 as being the lateral length 46. The teardrop 32 has a first end 34 that is outboard in the lateral direction 28 from the other portions of the teardrop 32. The first end 34 forms the lateral outboard end of the teardrop 32 and is located at and opens into the first lateral surface 18. In this regard, the first end 34 is in fluid communication with the sacrificial rib groove 56 and is located both higher and lower than the bottom of the sacrificial rib groove 56 in the thickness direction 24.

Figure 4:
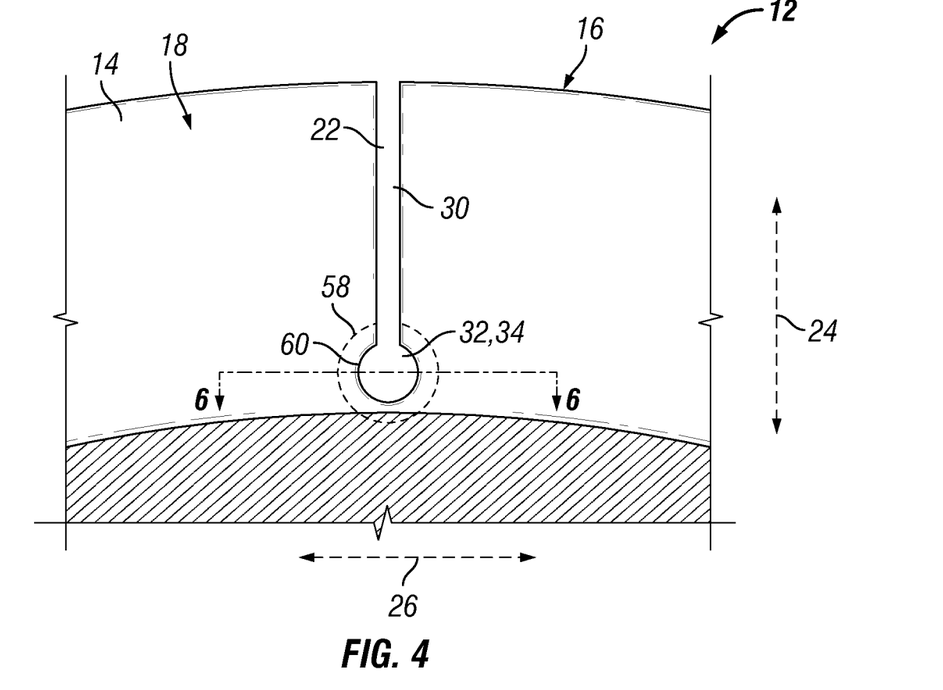
FIG. 4 is a cross-section view taken along line 4-4 of FIG. 2.

The first end 34 is shown as extending along ⅓ of the lateral length 46 of the teardrop 32 in the lateral direction 28. The first end 34 is a truncated cone shape such that it has a circular cross-sectional shape at any position in the lateral direction 28. The first end 34 has a first end base 58 that is located at ⅓ of the lateral length 46 of the teardrop 32 in the lateral direction 28 from the first lateral surface 18. A first end 60 of the first end 34 is the truncated portion of the cone shape of the first end 34 and is at the first lateral surface 18 as shown in FIG. 4. As can be seen in FIG. 4, the first end 60 is circular in shape and opens up into both the body 30 and the sacrificial rib groove 56. The truncated cone shape of the first end 34 constantly decreases in cross-sectional size along its entire lateral length from the first end base 58 to the first end 60 such that the diameter is larger at the first end base 58 than at the first end 60.

The opposite end of the teardrop 32 includes the second end 36 that extends over ⅓ of the lateral length 46 and opens into the second lateral end 19 which faces the shoulder groove 20. The second end 36 is likewise in the shape of a truncated cone with a second end base 62 on one end and a second end 64 at the other. The diameter of the second end base 62 is greater than that of the second end 64, and the diameter of the second end 36 constantly decreases in size all the way from the second end base 62 to the second end 64. FIG. 5 is a section view taken from inside of the shoulder groove 20 looking outboard in the lateral direction 28. The second end 64 is shown as having a circular cross-sectional shape and being open into the body 30 and the shoulder groove 20. Portions of the second end 36 are vertically lower than the bottom of the sacrificial rib groove 56 in the thickness direction 24, and portion so the second end 36 are also higher than the bottom of the sacrificial rib groove 56 in the thickness direction.

Figure 9:
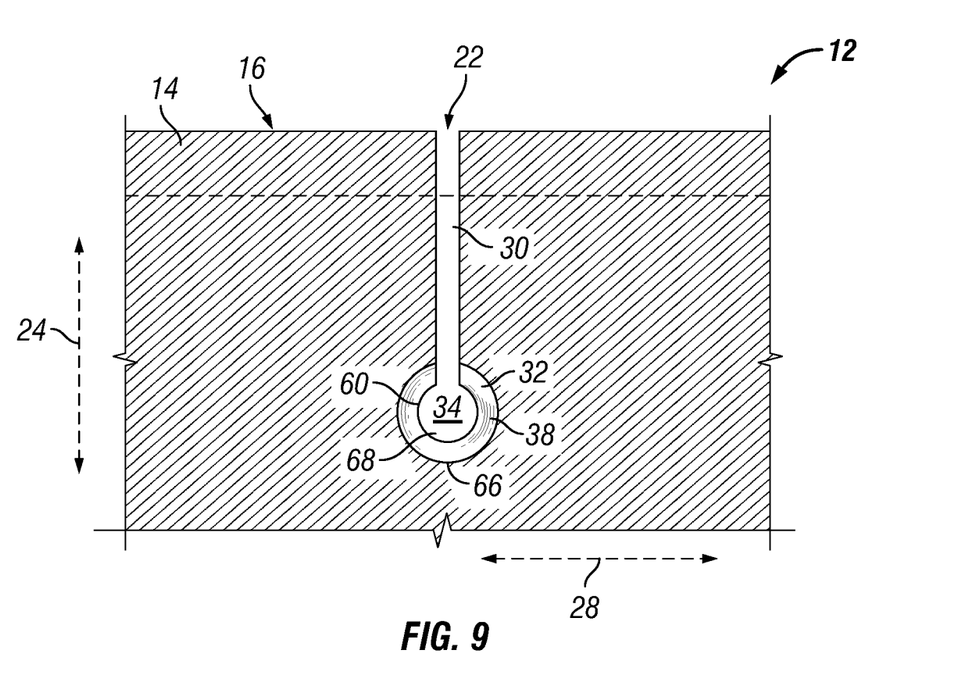
FIG. 9 is a cross-section view taken along line 9-9 of FIG. 2.

With reference back to FIG. 7, the teardrop 32 has a middle section 38 that also extends over ⅓ of the lateral length 46 and is located between the first end 34 and the second end 36 in the lateral direction 28. The lateral midpoint 40 of the teardrop 32 is at the half-way point of the lateral length 46 such that the lateral midpoint 40 falls within the middle section 38. The middle section 38 has a shape that is that of two truncated cones that extend in opposite directions from the lateral midpoint 40 in the lateral direction 28. A first middle section base 66 is located at the lateral midpoint 40 and extends in the lateral direction 28 toward the first end 34, terminating at a first middle section end 68. The first middle section end 68 overlays and is at the same position as the first end base 58. The first middle section end 68 has a smaller cross-sectional diameter than that of the first middle section base 66, and the diameter of the middle section 38 continuously decreases in size upon extension from the first middle section base 66 to the first middle section end 68. The transition from the middle section 38 to the first end 34 may be smooth such that a discernable point of transition is not present. In this regard, the diameter of the teardrop 32 can continuously decrease in size all the way from the first middle section base 66 to the first end 60. FIG. 9 shows the first middle section base 66 as being circular and larger than any other portion of the teardrop 32 from the lateral midpoint 40 to the first end 60. The body 30 is again open into the middle section 30, and the extension of the teardrop 32 is smooth from the first middle section base 66 to its end at the first end 60 such that a noticeable point of transition between the middle section 38 and the first end 34 is not present.

With reference back to FIG. 7, the middle section 38 also includes a second middle section base 70 that is located at the lateral midpoint 40 and that is also located at and overlays the first middle section base 66. The middle section 38 includes a second truncated cone shape that extends from the second middle section base 70 to the second middle section end 72 in the lateral direction 28. The second middle section end 72 is located at and overlays the second end base 62, and the middle section 38 and the second end 36 may not have a noticeable transition between them such that the teardrop 32 continuously decreases in diameter at all times from the second middle section base 70 to the second end 64 inboard in the lateral direction 28. As such, the teardrop 32 is arranged in the shape of two truncated cones both extending from the lateral midpoint 40 but in opposite directions, one inboard and one outboard, in the lateral direction 28. The teardrop 32 is farthest from the upper surface 16 in the thickness direction 24 at the lateral midpoint 40. As such, the middle section 38 is the part of the teardrop 32 farthest from the upper surface 16 in the thickness direction 24, and in particular the part of the middle section 38 at the lateral midpoint 40 is the portion that is farthest from the upper surface 16.

The first and second ends 34, 36 are symmetric such that they both extend the same amount away from the upper surface 16 in the thickness direction 24. The middle section 38 also includes the part of the teardrop 32 that is closest to the upper surface 16 in the thickness direction 24 and this closest portion is located at the lateral midpoint 40. The middle section 38 thus has a part that is closer to the upper surface 16 in the thickness direction 24 than any portion of the first end 34 or the second end 36. A central axis will extend through the entire teardrop 32 such that the central axis is located at the center of the first end 60, first end base 58, first middle section end 68, first middle section base 66, second middle section base 70, second end base 62, second middle section end 72, and second end 64 both in the thickness direction 24 and in the circumferential direction 26. The truncated cone shapes of the teardrop 32 is arranged so that this central axis of the teardrop 32 is located at the same distance to the upper surface 16 in the thickness direction 24 along the entire lateral length 46 and does not vary in distance to the upper surface 16 in the thickness direction 24 at any point.

The teardrop 32 is configured so that it has a larger size/diameter at its center, which is shown as being the middle section 38 and in particular the lateral midpoint 40 within the middle section 38. The middle section 38 is thus greater in cross-sectional size than the first end 34 or second end 36. It has been discovered that cracks which may form in the teardrop 32 are more likely to form at the middle of the teardrop 32 and thus in the middle section 38 than at the ends of the teardrop 32 which include the first end 34 and the second end 36. In this regard, an increase in size of the teardrop 32 at the middle section 38 prevents or minimizes crack formation and/or propagation of the crack along the teardrop 32. Since the crack is more likely to form and propagate at the middle section 38 than at the ends 34, 36, the first and second ends 34 and 36 can be made smaller than the middle section 38 in cross-sectional size/diameter thus increasing the rigidity of the shoulder rib 14 at the sipe 22 since less rubber is missing from the shoulder rib 14 at the first and second ends 34, 36.

As shown in the cross-sectional view of FIG. 6, the sipe 22, including the body 30 and the teardrop 32, form a continuous void from the first end 60 to the second end 64 so that the sacrificial rib groove 56 is in fluid communication with the shoulder groove 20. The sipe 22 is arranged completely in the lateral direction 28 so that it is symmetric about a line in the center of the teardrop 32 extending completely in the lateral direction 28.

Figure 10:
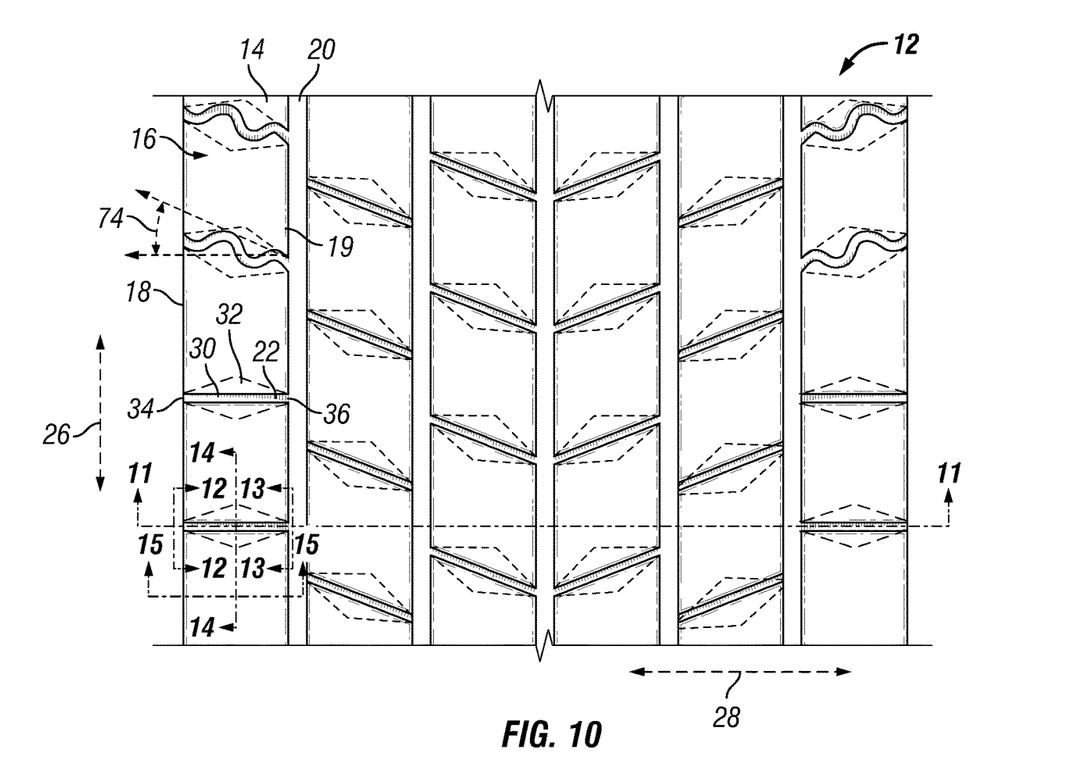
FIG. 10 is a top view of a tread having the sipe in the rib in accordance with another exemplary embodiment.
Figure 11:
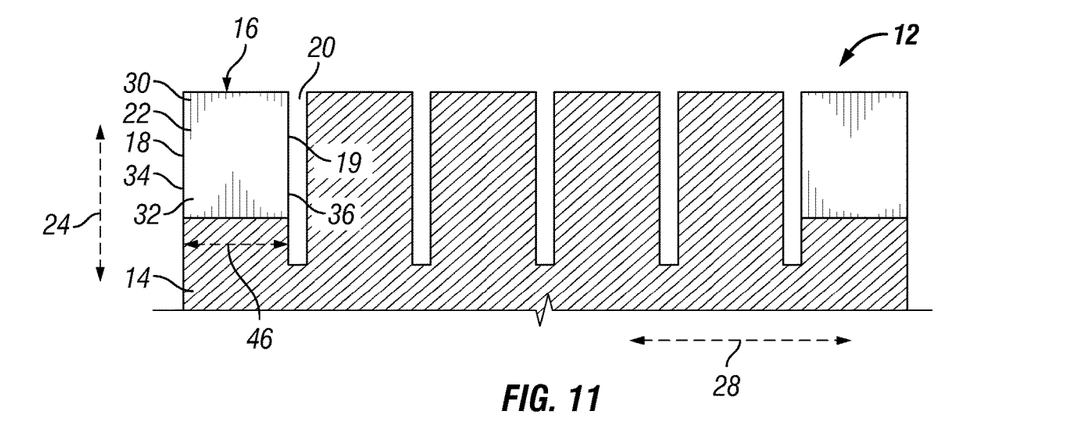
FIG. 11 is a cross-section view taken along line 11-11 of FIG. 10.

The tread 12 in accordance with another exemplary embodiment is shown with reference to FIG. 10. Here, a sacrificial rib 54 is not present, and the shoulder rib 14 is thus the outward most feature of the footprint of the tread 12 in the lateral direction 28. The sipes 22 are not all the same, but are varied in their orientation relative to the lateral direction 28, and are constructed with teardrops 32 that are different from those previously discussed with respect to the FIGS. 2-9 embodiment. The sipe 22 again includes a body 30 that extends from the first lateral surface 18 to the second lateral surface 19, and a teardrop 32 that extends from the body 30 into the tread 12 in the thickness direction 24. FIG. 11 is a cross-sectional view through a portion of the tread 12 and also through two of the sipes 22 that are oriented so that they both extend in the lateral direction 28. The teardrop 32 is arranged differently than that previously discussed in that the bottom of the teardrop 32 is located the same distance from the upper surface 16 in the thickness direction 24 at all points along the entire lateral length 46. All of the ribs of the tread 12 extend the same height in the thickness direction 24 so that their upper surfaces are all located the same amount in the thickness direction 24.

Figure 12:
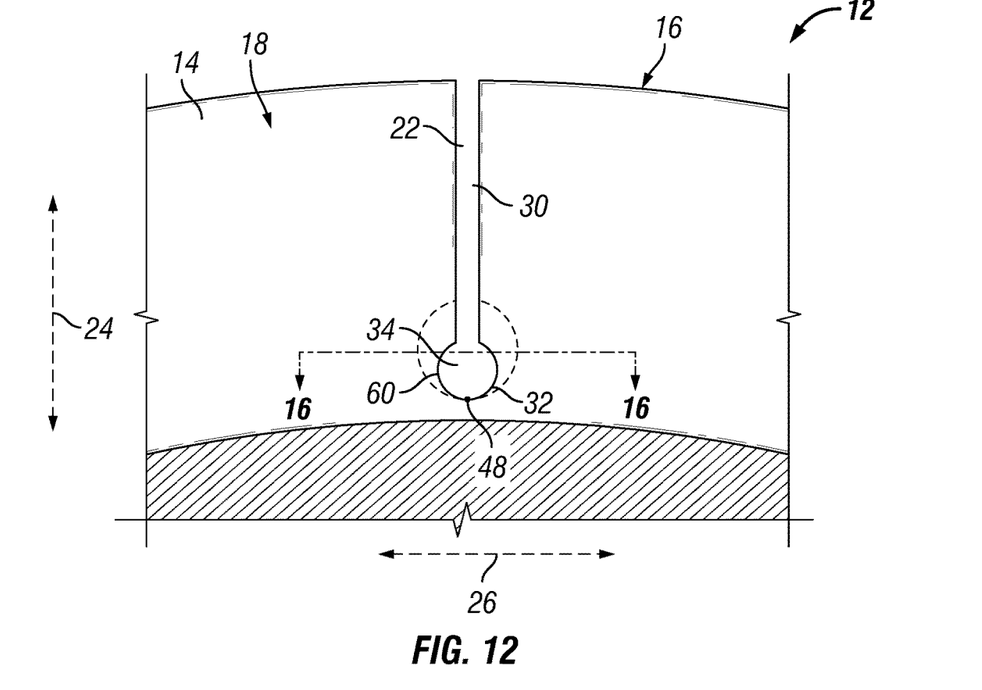
FIG. 12 is a cross-section view taken along line 12-12 of FIG. 10.
Figure 13:
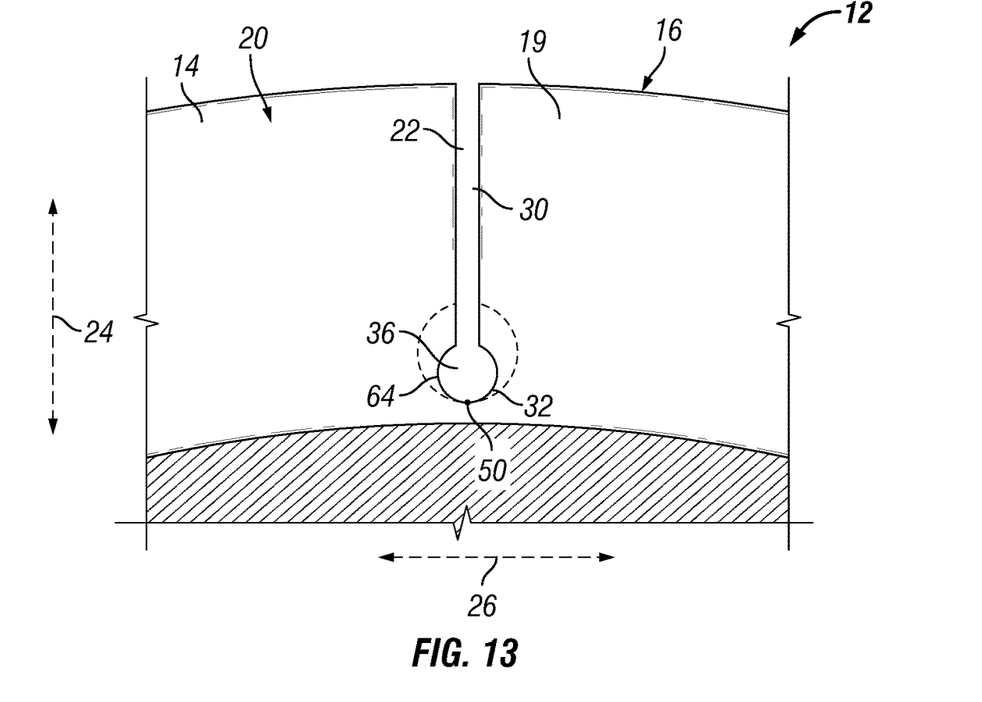
FIG. 13 is a cross-section view taken along line 13-13 of FIG. 10.
Figure 14:
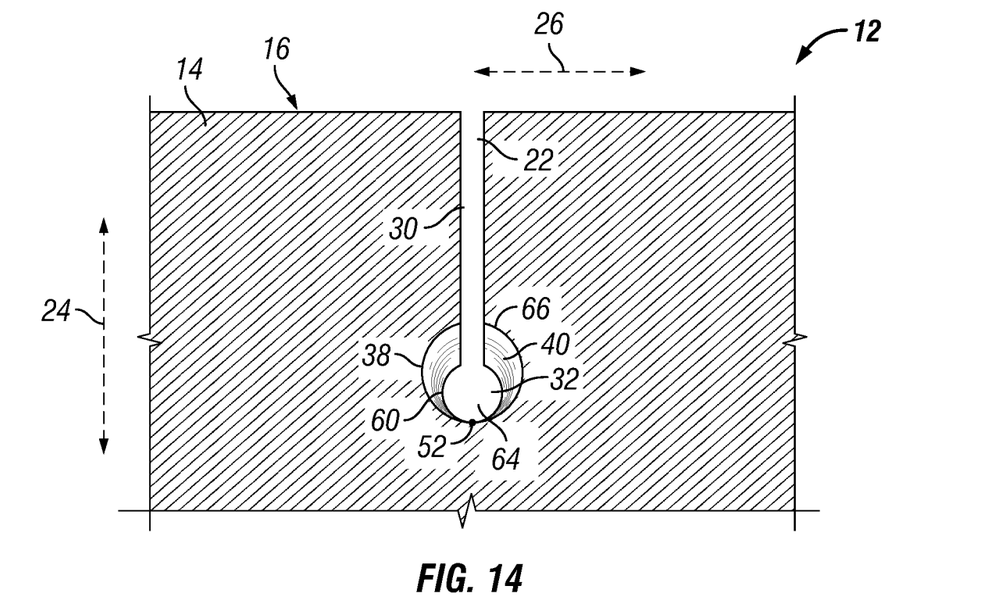
FIG. 14 is a cross-section view taken along line 14-14 of FIG. 10.

FIG. 12 is a cross-sectional view of the sipe 22 at the first end 34 which is circular in cross-sectional shape and opens up into the body 30 and also opens out into the first lateral surface 18. The first end 34 has a first end farthest point of extension 48 that is the portion of the first end 34 farthest from the upper surface 16 in the thickness direction 24. Extending into the shoulder rib 14 in the lateral direction 28 from the first end 60 the teardrop 32 likewise extends upwards in the thickness direction 24 towards the outer surface 16 but not away from the outer surface 16 in the thickness direction 24. FIG. 13 is a cross-sectional view on the opposite end of the sipe 22 taken from inside of the shoulder groove 20 showing the second end 36 opening into the second lateral surface 19 and shoulder groove 20 and also the body 30. The second end 36 is symmetric to the first end 34 and likewise has a second end farthest point of extension 50 that is the portion of the second end 36 farthest from the upper surface 16 in the thickness direction 24. FIG. 14 is a cross-sectional view taken through the lateral midpoint 40 pointed towards the first end 34. As can be seen, the cross-sectional shape of the teardrop 32 is again circular at all points along the lateral length 46. The body 30 likewise opens up into the teardrop 32 at all points along the lateral length 46. The teardrop 32 has a smooth transition from the lateral midpoint 40 to the first end 60 such that a lip or other discrepancy is not present along its length. The teardrop 32 may decrease in diameter continuously from the lateral midpoint 40 to the first end 60. Also, the axis though which the circular cross-sectional shape of the teardrop 32 extends will move away from the upper surface 16 in the thickness direction 24 upon extension of the teardrop 32 away from the lateral midpoint 40 in the lateral direction 28. The middle section 38 has a middle section farthest point of extension 52 that is the farthest point of the middle section 38 from the upper surface 16 in the thickness direction 24.

Figure 15:
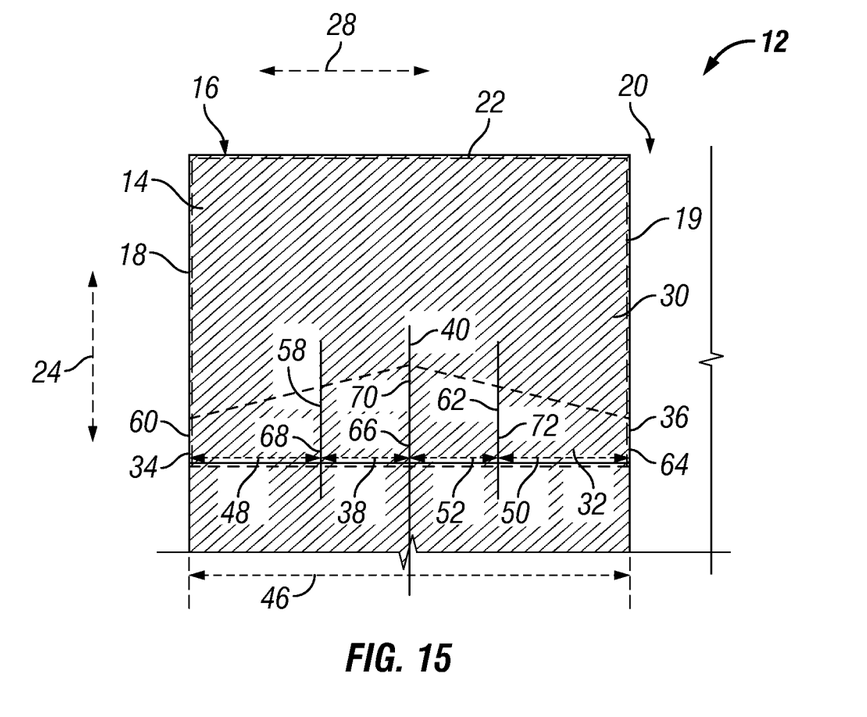
FIG. 15 is a cross-section view taken along line 15-15 of FIG. 10.

Another cross-sectional view of the teardrop 32 is shown with reference to FIG. 15 taken from inside of the shoulder rib 14 and looking at a side view of the sipe 22. The teardrop 32 may again be broken up into a first end 34, a second end 36, and a middle section 38. Each one of these portions 32, 34, 36 extends over ⅓ of the lateral length 46. The first end 34 has a first end base 58 and an oppositely disposed first end 60 at the first lateral surface 18 in which the diameter of the first end 34 decreases continuously from the first end base 58 to the first end 60 upon extension in the lateral direction 28. The diameter of the first end base 58 is greater than the diameter of the first end 60. The first end farthest point of extension 48 is consistent along the entire length of the first end 34 in the lateral direction 28 such that all lateral points of the first end have the same farthest first end farthest point of extension 48. The axis of the first end 34 will therefore change in position in the thickness direction 24 upon the particular location of the cross-section of the first end 34 in the lateral direction 28. The cross-section of the first end 34 is circular in shape at all points in the lateral direction 46.

The second end 36 is configured in the same manner as that previously discussed with respect to the first end 34. The second end farthest point of extension 50 extends along the entire length of the second end 36 in the lateral direction 28. The diameter of the second end 36 continuously decreases in size from the bigger second end base 62 to the smaller second end 64. The location of the axis of the cross-section of the second end 36 moves away from the upper surface 16 in the thickness direction 24 upon extension of the second end 64 to the shoulder groove 20 in the lateral direction 46 from the second end base 62. The middle section 38 has a middle section farthest point of extension 52 that is the portion of the middle section 38 farthest from the upper surface 16 in the thickness direction 24 and extends along the entire lateral length of the middle section 38 in the lateral direction 28. The middle section 38 extends along ⅓ of the lateral length 46 and is between the ends 34, 36 and forms a smooth transition with them to form the teardrop 32. The teardrop 32 is closest to the upper surface 16 in the thickness direction 24 at the lateral midpoint 40. The middle section 38 extends from a first middle section base 66 at the lateral midpoint 40 to a first middle section end 68 at the first end base 58 and decreases in cross-sectional diameter at all points along this extension. In an opposite direction, the middle section 38 extends from a second middle section base 70 at the lateral midpoint 40 to a second middle section end 72 at the second end base 62, and its diameter decreases in size at all points in the lateral direction 28 along this extension.

The shape of the teardrop 32 is thus larger in the center and smaller on the ends in the lateral direction 28, and may have a circular cross-sectional shape at all points in the lateral direction 28. The bottom of the teardrop 32 is arranged so that the entire bottom is located the same distance from the upper surface 16 in the thickness direction 24. The portion of the teardrop 32 that opens into the body 30 and is closest to the upper surface 16 in the thickness direction 24 varies in distance to the upper surface 16 upon its extension in the lateral direction 28. The shape of the teardrop 32 is greatest at the middle section 38 than at the ends 34, 36 such that it has a greater volume and diameter. The teardrop 32 will be better protected from tearing since the middle section 32 is larger as the teardrop 32 is most susceptible to tearing at the center of the shoulder rib 14 in the lateral direction 28, and the greater the teardrop 32 is in size in this area will function to reduce the chance of cracks forming at this location. By having the ends 34, 36 smaller, the shoulder rib 14 will have more material thus causing it to be more rigid so that the design of the teardrop 32 maintains wear and rolling resistance performance and at the same time reduces cracking and does not require the teardrop 32 be placed closer to the upper surface 16 in the thickness direction 24 so that end of service traction is not impacted.

Figure 16:
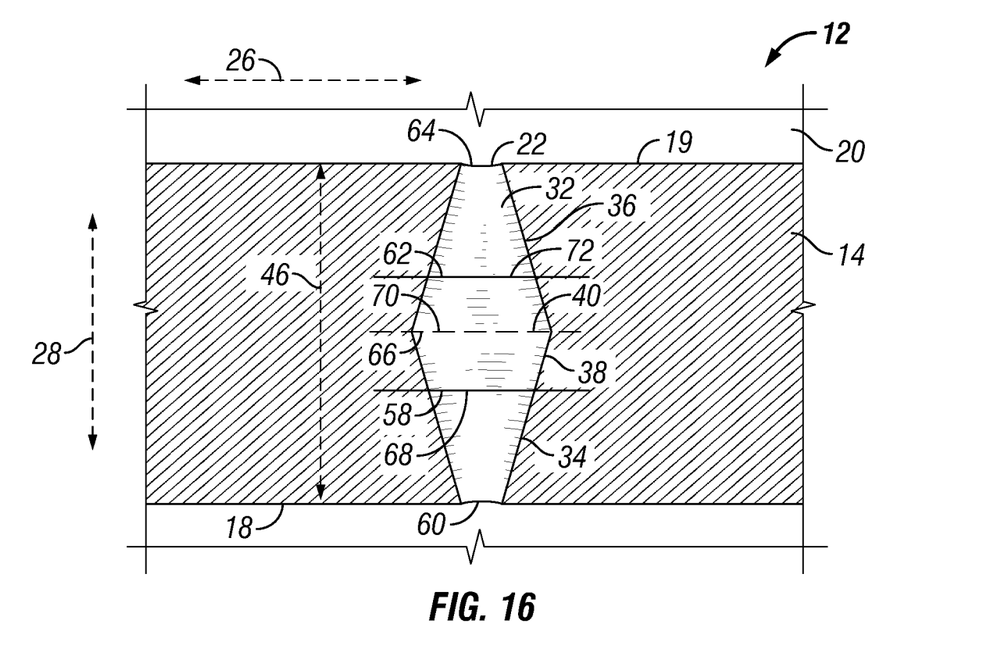
FIG. 16 is a cross-section view taken along line 16-16 of FIG. 12.

The first end farthest point of extension 48, the second end farthest point of extension 50, and the middle section farthest point of extension 52 are all located at the same distance from the upper surface 16 in the thickness direction 24. As such, the entire end of the teardrop 32 farthest from the upper surface 16 is the same distance from it in the thickness direction 24. FIG. 16 shows a cross-section through the teardrop 32 and it is to be understood that the bottom of the teardrop 32 has a concave shape and is not a linear line. The teardrop 32 is open in that a continuous void extends all the way from the first lateral surface 18 through the shoulder rib 14 and to the second lateral surface 19. The teardrop 32 is symmetric about a plane in the lateral direction 28 and thickness direction 24 that extend through the center of the teardrop 32, but the teardrop 32 is not symmetric about a plane in the lateral direction 28 and circumferential direction 26 that extends through the center of the teardrop 32. The teardrop has its greatest extent in the circumferential direction 26 both forwards and backwards at the lateral midpoint 40 in the middle section 38.

The body 30 and teardrop 32 has been shown and described as extending in a completely lateral direction 28 along their entire lengths from the first lateral surface 18 to the second lateral surface 19. However, this need not be the case in other embodiments. Referring back to FIG. 10, four of the sipes 22 are oriented at an angle 74 to the lateral direction 28. The four sipes 22 at the bottom of the tread 16 in the circumferential direction 26 extend completely in the lateral direction 28 as a comparison. The angle 74 of the four angled sipes 22 can be from 5-10 degrees, from 10-15 degrees, from 15-20 degrees, from 20-25 degrees, from 25-30 degrees from 2-7 degrees, from 10-20 degrees, or up to 30 degrees in accordance with various exemplary embodiments. The angle 74 is of both the body 30 and teardrop 32 as measured between their points of engagement from the second lateral surface 19 to the first lateral surface 18, or as measured from their points of engagement from the first lateral surface 18 to the second lateral surface 19. The sipes 22 can thus be variously angled with respect to the lateral direction 28 and are not limited to a specific single angle. All of the sipes 22 of the tread 12 may be oriented at the same angle 74, or the various sipes 22 of the tread 12 may be oriented at different angles 74. Although shoulder notches are not shown in any of the disclosed embodiments, it is to be understood that the first lateral surface 18 could include shoulder notches into which the sipes 22 open.

Figure 17:
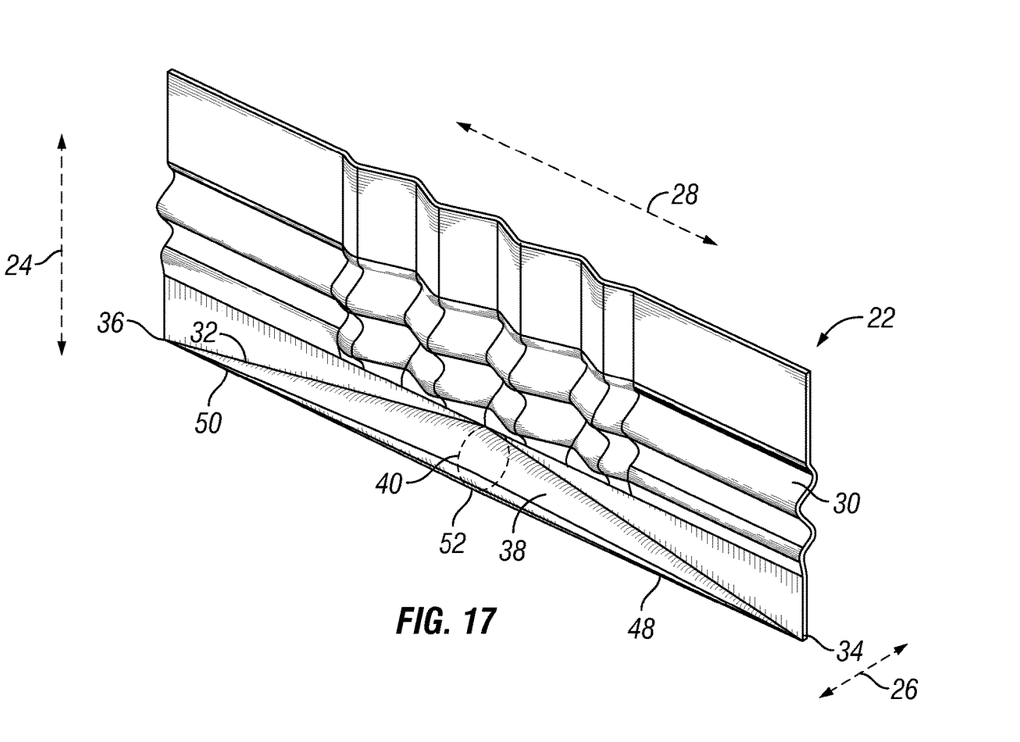
FIG. 17 is a perspective view of a sipe in accordance with a different exemplary embodiment.

FIG. 17 is a perspective view of a sipe 22 that has a teardrop 32 similar to that previously discussed with respect to FIGS. 10-16 in which the farthest points of extension 48, 50, 52 of the middle section 38 and ends 34, 36 are all at the same distance to the upper surface 16 in the thickness direction 24. The body 30 is shaped differently than that of other embodiments in that it is not just a linear shape, but instead is zig-zag in shape both in the lateral direction 28 of extension and in the thickness direction 24 of extension. The section of the body 30 moving into engagement with the teardrop 32 is linear in shape. However, the zig-zag portions of the body 30 may engage the teardrop 32 along some or all of its lateral length 46 in other embodiments. As such, it is to be understood that the body 30 can be ziz-zag in shape in certain areas, or may be completely zig-zag in shape from the upper surface 16 to the teardrop 32 along the entire lateral length 46. The body 30 may be variously shaped in accordance with different exemplary embodiments.

Figure 18:
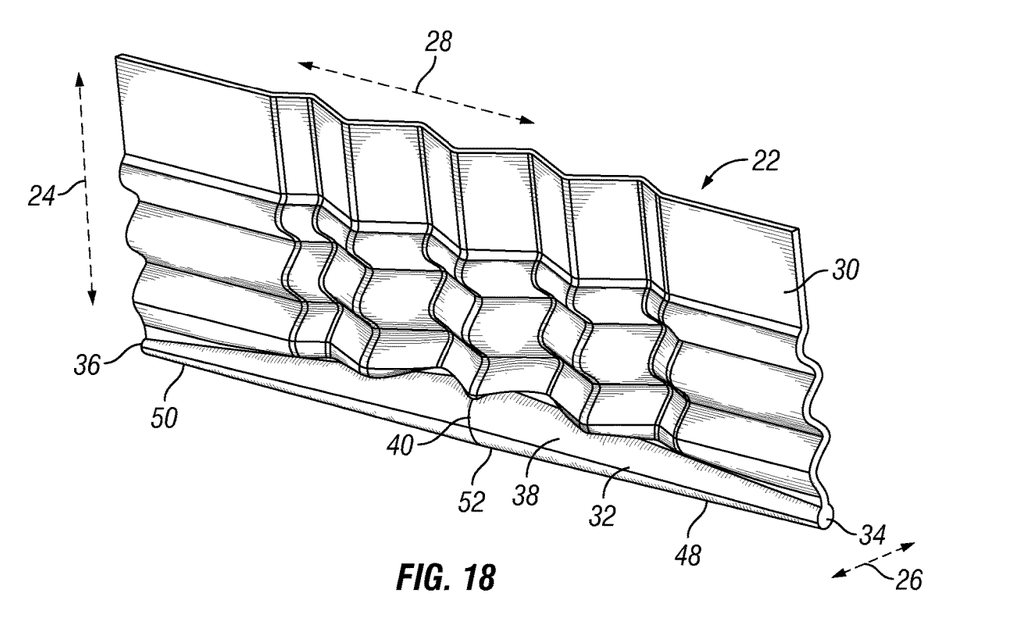
FIG. 18 is a perspective view of a sipe in accordance with a yet different exemplary embodiment.

FIG. 18 shows the sipe 22 having the teardrop 32 configured as that previously described with reference to FIGS. 2-9. The body 30 is zig-zag in shape both in the lateral direction 28 and in the thickness direction 24, although it may only be zig-zag in shape in one of those directions 24, 28 in other embodiments. The zig-zag body 30 may engage the teardrop 32 along some or all of its lateral length 46, or may be completely spaced from the teardrop 32 so that no portion of the zig-zag body 30 engages the teardrop 32. Although shown as being a combination of zig-zag shape and linear shape, it is to be understood that various embodiments of the sipe 22 as disclosed herein may have a body 30 of any shape. The zig-zag shape "locks" the rubber making up the shoulder rib 14 together to increase rigidity when this portion of the shoulder rib 14 enters the contact patch.

The presently disclosed sipe 22 in the shoulder rib 14 by being larger in its middle section 38 and smaller in its end sections 34, 36 (as measured by the diameter of the sections overall at these locations and/or as measured by a comparison between the largest and smallest diameters between these sections 38, 34, 36) allows for end of life traction, minimizes the impact to rolling resistance and wear, and minimizes or eliminates cracking within the teardrop 32. The increase in size of the teardrop 32 is put into the locations of the teardrop 32 most likely to experience the cracking which is the middle section 38. The ends 34, 36 are smaller which increases the rigidity of the shoulder rib 14 at the sipe 22 which minimizes the negative impact upon the rolling resistance and wear characteristics. The solution provide is a combination of both end of life performance and added rigidity in reducing or minimizing the formation of cracking within the sipe 22.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread that has a lateral direction, a thickness direction, and a circumferential direction, comprising:
   a rib having a first lateral surface and a second lateral surface, wherein the rib has an upper surface; and
   a sipe located in the rib that extends from the first lateral surface to the second lateral surface, wherein the sipe has a body and a teardrop, wherein a first end of the teardrop is located at and engages the first lateral surface, wherein a second end of the teardrop is located at and engages the second lateral surface, and wherein the teardrop has a middle section that is located between the first end of the teardrop and the second end of the teardrop in the lateral direction, and wherein a lateral midpoint of the teardrop in the lateral direction is located at the middle section;

wherein a cross-section of the teardrop of the middle section at the lateral midpoint is greater in size than a cross-section of the teardrop of the first end, and wherein the cross-section of the teardrop of the middle section at the lateral midpoint is greater in size than a cross-section of the teardrop of the second end;

wherein the body engages the teardrop and has a consistent width completely from the first end of the teardrop to the second end of the teardrop, and wherein the cross-section of the teardrop continuously decreases in size from the middle section at the lateral midpoint to the first end;

wherein a bottom of the teardrop extends from the first lateral surface to the second lateral surface and is a portion of the teardrop that is farthest from the upper surface in the thickness direction, wherein the bottom of the teardrop is farthest from the upper surface in the thickness direction at the lateral midpoint;

wherein the bottom extends continuously closer to the upper surface in the thickness direction upon extension from the lateral midpoint to the first lateral surface; and wherein the bottom of the teardrop extends continuously closer to the upper surface in the thickness direction upon extension from the lateral midpoint to the second lateral surface;

wherein the rib is a shoulder rib, and wherein the tread has a shoulder groove next to the shoulder rib in the lateral direction and wherein the second lateral surface faces the shoulder groove;

further comprising a sacrificial rib that is located outboard from the shoulder rib in the lateral direction, and wherein a sacrificial rib groove is located between the shoulder rib and the sacrificial rib in the lateral direction, and wherein the first lateral surface faces the sacrificial rib groove, and wherein a bottom of the sacrificial rib groove is a portion of the sacrificial rib groove that is farthest from the upper surface in the thickness direction;

wherein the first end extends along ⅓ of a lateral length of the teardrop, wherein the second end extends along ⅓ of the lateral length of the teardrop, and wherein the middle section extends along ⅓ of the lateral length of the teardrop;

wherein a distance from the upper surface to a portion of the first end in the thickness direction is farther than a distance from the upper surface to the bottom of the sacrificial rib groove in the thickness direction.

2. The tread as set forth in claim 1, wherein the shoulder rib has a plurality of rib grooves that cause the shoulder rib to be arranged as a plurality of shoulder rib blocks.

3. The tread as set forth in claim 1, wherein the cross-section of the teardrop of the first end is measured at the first lateral surface, and wherein the cross-section of the teardrop of the second end is measured at the second lateral surface.

4. The tread as set forth in claim 1, wherein the lateral midpoint of the teardrop is closer to the upper surface in the thickness direction than any portion of the first end or the second end is to the upper surface in the thickness direction.

5. The tread as set forth in claim 1, wherein the body is zig-zag in shape.

6. The tread as set forth in claim 1, wherein the cross-section of the teardrop of the entire middle section is circular in shape, wherein the cross-section of the teardrop of the entire first end is circular in shape, and wherein the cross-section of the teardrop of the entire second end is circular in shape.

7. The tread as set forth in claim 1, wherein the tread is a retread band.

8. The tread as set forth in claim 1, wherein the first end of the teardrop is in the shape of a truncated cone having a first end base located inboard in the lateral direction from a first end end that is located at the first lateral surface, wherein the second end of the teardrop is in the shape of a truncated cone having a second end base located outboard in the lateral direction from a second end end that is located at the second lateral surface;

wherein the middle section of the teardrop has a first middle section truncated cone shape extending outboard from the lateral midpoint in the lateral direction such that a first middle section base is located at the lateral midpoint and a first middle section end is located at the first end base and is the same size as the first end base;

wherein the middle section of the teardrop has a second middle section truncated cone shape extending inboard from the lateral midpoint in the lateral direction such that a second middle section base is located at the lateral midpoint and a second middle section end is located at the second end base and is the same size as the second end base.

9. The tread as set forth in claim 1, wherein the sipe is angled from 5 degrees to 20 degrees relative to the lateral direction upon extension from the first lateral surface to the second lateral surface.

* * * * *